US012718355B2

(12) United States Patent
Giachi et al.

(10) Patent No.: US 12,718,355 B2
(45) Date of Patent: Aug. 25, 2026

(54) METHOD FOR CHECKING AND VERIFYING THE CORRECT STRIPPING PROCESS OF THE INSULATING LAYER IN PREDEFINED SECTIONS OF A CONDUCTING WIRE COVERED BY A LAYER OF DIELECTRIC MATERIAL, AND RELATED ASSEMBLY FOR CHECKING AND VERIFYING

(71) Applicant: ATOP S.P.A., Barberino Tavarnelle (IT)

(72) Inventors: Massimiliano Giachi, San Gimignano (IT); Anton Giulio Rogai, Barberino Tavarnelle (IT)

(73) Assignee: ATOP S.P.A., Barberino Tavarnelle (IT)

( * ) Notice: Subject to any disclaimer, the term of this patent is extended or adjusted under 35 U.S.C. 154(b) by 0 days.

(21) Appl. No.: 19/103,274

(22) PCT Filed: Aug. 29, 2023

(86) PCT No.: PCT/EP2023/073669
§ 371 (c)(1),
(2) Date: Feb. 12, 2025

(87) PCT Pub. No.: WO2024/047038
PCT Pub. Date: Mar. 7, 2024

(65) Prior Publication Data

US 2026/0057507 A1 Feb. 26, 2026

(30) Foreign Application Priority Data

Aug. 29, 2022 (IT) ........................ 102022000017700

(51) Int. Cl.
*G06T 7/00* (2017.01)
*B23K 26/36* (2014.01)
(Continued)

(52) U.S. Cl.
CPC .............. *G06T 7/001* (2013.01); *B23K 26/36* (2013.01); *H02G 1/128* (2013.01); *H04N 23/90* (2023.01); *G06T 2207/10016* (2013.01)

(58) Field of Classification Search
CPC .......... G06T 7/001; G06T 2207/10016; B23K 26/36; H02G 1/128; H04N 23/90
(Continued)

(56) References Cited

U.S. PATENT DOCUMENTS 4,649,621 A * 3/1987 Dusel .................... H01R 43/28 382/141
8,640,326 B2 * 2/2014 Yano .................... G06T 7/0008 356/242.1

(Continued)

FOREIGN PATENT DOCUMENTS

| | | | |
|---|---|---|---|
| DE | 102019216245 | B3 | 11/2020 |
| EP | 3757939 | A1 | 12/2020 |
| WO | 2021153807 | A1 | 8/2021 |

OTHER PUBLICATIONS

Italian Search Report for Italian Application No. IT102022000017700 completed on Mar. 22, 2023.

(Continued)

*Primary Examiner* — Helen Shibru
(74) *Attorney, Agent, or Firm* — Carlson, Gaskey & Olds, P.C.

(57) ABSTRACT

A method for checking and verifying the correct stripping process on sections of a conducting wire covered by a layer of dielectric material, comprising the steps of: tagging the advancing wire with stripped sections, the tagging comprising acquiring information related to a position and/or a time at a predefined sampling rate; acquiring images of said wire by at least one video camera arranged proximal to and facing at least one face of the wire; associating the images acquired by the at least one video camera with a respective tagging (Continued)

information acquired for the same point on the wire; extracting features from the images acquired by the at least one video camera and comparing them with respective reference features to verify a correct dimension and/or relative position and/or absence of residues of dielectric material on the surface of each stripped section along the wire.

14 Claims, 8 Drawing Sheets

(51) Int. Cl.
*H02G 1/12* (2006.01)
*H04N 23/90* (2023.01)

(58) Field of Classification Search
USPC ....... 348/92; 382/141, 148, 149; 219/121.45
See application file for complete search history.

(56) References Cited

U.S. PATENT DOCUMENTS

| | | | | |
|---|---|---|---|---|
| 9,612,210 | B2 * | 4/2017 | Ray | G01N 21/8806 |
| 11,933,736 | B2 * | 3/2024 | Tillotson | G01N 21/952 |
| 12,555,250 | B1 * | 2/2026 | Piety | G01M 7/025 |
| 2012/0304461 | A1 * | 12/2012 | Kihara | H01R 43/28<br>29/863 |
| 2015/0162729 | A1 | 6/2015 | Reversat et al. | |
| 2017/0153372 | A1 * | 6/2017 | Yang | C23C 14/085 |

OTHER PUBLICATIONS

International Search Report and Written Opinion for International Application No. PCT/EP2023/073669 completed on Nov. 28, 2023.

* cited by examiner 2
12
G
13
11
H
14
2

100
101
102
103
104
105

200
201
202
203
204
205

METHOD FOR CHECKING AND VERIFYING THE CORRECT STRIPPING PROCESS OF THE INSULATING LAYER IN PREDEFINED SECTIONS OF A CONDUCTING WIRE COVERED BY A LAYER OF DIELECTRIC MATERIAL, AND RELATED ASSEMBLY FOR CHECKING AND VERIFYING

The present invention relates to a method for checking and verifying the correct stripping process of the insulating layer in predefined sections of a conducting wire covered by a layer of dielectric material, and a related assembly for checking and verifying.

In numerous applications, the use is frequent of wires made of conducting material (generally copper) covered by a layer of dielectric material (i.e. an electrical insulator).

To provide windings for numerous electric machines (electric motors, electricity generators, transformers) the use is known of segments of conducting wire covered by insulation, which are conveniently arranged within recesses (or other seats) of the ferromagnetic core and are interconnected in accordance with the logic required by the specific type of electrical winding to be provided.

The ends of these wire segments (generally contoured in predefined shapes, the most common of which is known in the sector as a "hairpin") must necessarily be stripped off the insulating layer, so that when they are connected with other segments by welding no material will be present apart from the metal conductor (generally copper). The presence of the layer of dielectric material, in fact, could leave residues of carbon or other material which could compromise the quality of the welding.

The machines that produce wire segments (for example hairpins) comprise assemblies suitable to remove the insulating layer (mechanical stripping or thermal stripping, using a laser or other heat sources). Nowadays it is not possible to make a complete and effective estimate of the quality of stripping of the insulating layer of dielectric material (corresponding to sections in which the metallic surface is completely exposed and any residue of dielectric material is absent).

It is known to use a video camera (or a TV camera or a still camera or another image acquisition system) facing the wire, which detects the dimensions and the features of the portion of wire toward which it is oriented: by virtue of such video camera it is possible to check the length of each section from which the insulation has been removed, also checking if such stripping is complete or if there are any residues. This is clearly possible only for the portion of wire that is directed toward the video camera, deeming therefore that the contiguous lateral surfaces of the wire have features that are similar to those of the surface facing the video camera.

The aim of the present invention is to solve the above-mentioned drawbacks, by providing a method for checking and verifying the correct stripping process of the insulating layer in predefined sections of a conducting wire covered by a layer of dielectric material that makes it possible to inspect the external surface of the whole wire.

Within this aim, an object of the invention is to provide a method for checking and verifying the correct stripping process of the insulating layer in predefined sections of a conducting wire covered by a layer of dielectric material that ensures the identification of defects in the quality, uniformity, and geometry of the surfaces of the sections stripped of insulation.

Another object of the invention is to provide a method for checking and verifying the correct stripping process of the insulating layer in predefined sections of a conducting wire covered by a layer of dielectric material that makes it possible to identify any residues of insulation on all the surfaces of the section stripped of insulation.

Another object of the invention is to provide an assembly for checking and verifying the correct stripping process of the insulating layer in predefined sections of a conducting wire covered by a layer of dielectric material that is adapted to detect the surface features of the entire wire.

Another object of the invention is to provide an assembly for checking and verifying the correct stripping process of the insulating layer in predefined sections of a conducting wire covered by a layer of dielectric material that is adapted to detect the correct dimensions and/or the correct alignments and/or the presence of residues of dielectric material and/or the correct position of each section stripped of the surface insulating layer of dielectric material of the wire.

Another object of the present invention is to provide a method for checking and verifying the correct stripping process of the insulating layer in predefined sections of a conducting wire covered by a layer of dielectric material and a related assembly for checking and verifying, which are low-cost, easy-to-use, easily installable and safe.

This aim and these and objects that will become more apparent hereinafter are achieved by a method for checking and verifying the correct stripping process of the insulating layer in predefined sections of a conducting wire covered by a layer of dielectric material according to claim 1.

Such aim and such objects are also achieved by way of a software application for checking and verifying the correct stripping process of the insulating layer in predefined sections of a conducting wire covered by a layer of dielectric material, in an apparatus for treating and shaping components of an electrical winding of an electric machine according to claim 9.

Such aim and such objects are also achieved by way of an assembly for checking and verifying the correct stripping process of the insulating layer in predefined sections of a conducting wire covered by a layer of dielectric material according to claim 10.

Further characteristics and advantages of the invention will become more apparent from the detailed description that follows of a preferred, but not exclusive, embodiment of the assembly for checking and verifying the correct stripping process of the insulating layer in predefined sections of a conducting wire covered by a layer of dielectric material, which carries out the method according to the invention, as well as of the method itself according to the invention and of the software application according to the invention, which are illustrated by way of non-limiting example in the accompanying drawings, wherein:

Figure 1:
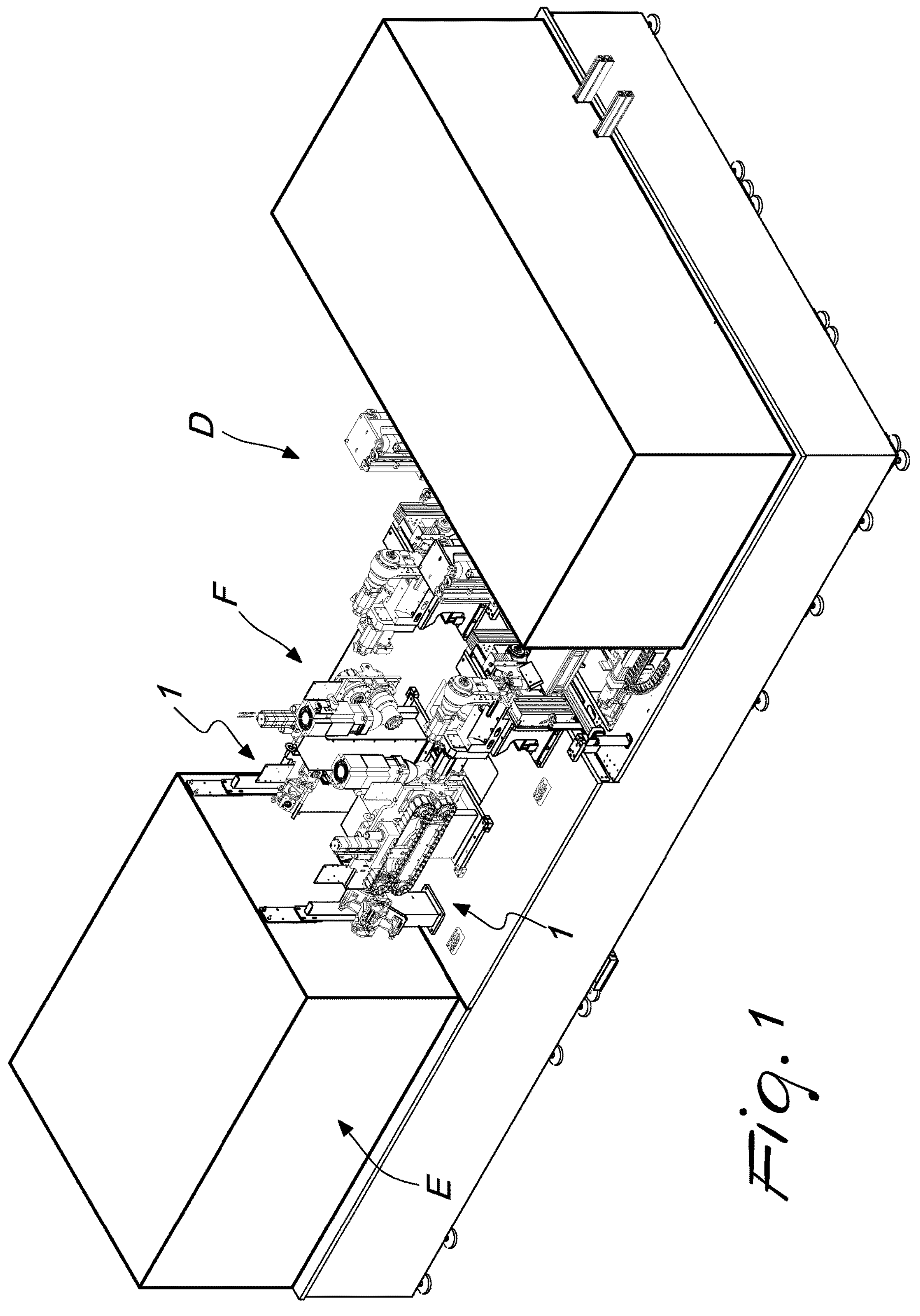
FIG. 1 is a schematic perspective view of a possible embodiment of an apparatus comprising an assembly for checking and verifying the correct stripping process of the insulating layer in predefined sections of a conducting wire covered by a layer of dielectric material according to the invention.
Figure 2:
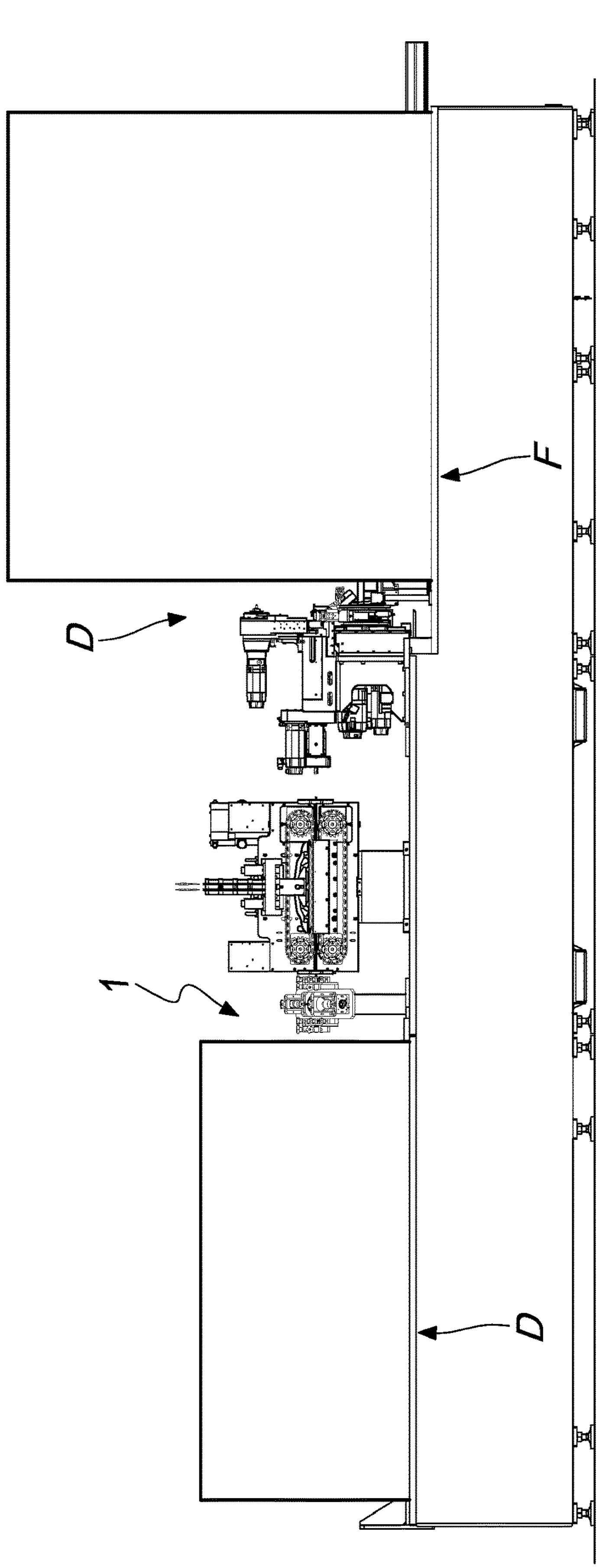
FIG. 2 is a schematic front elevation view of the apparatus of FIG. 1.
Figure 3:
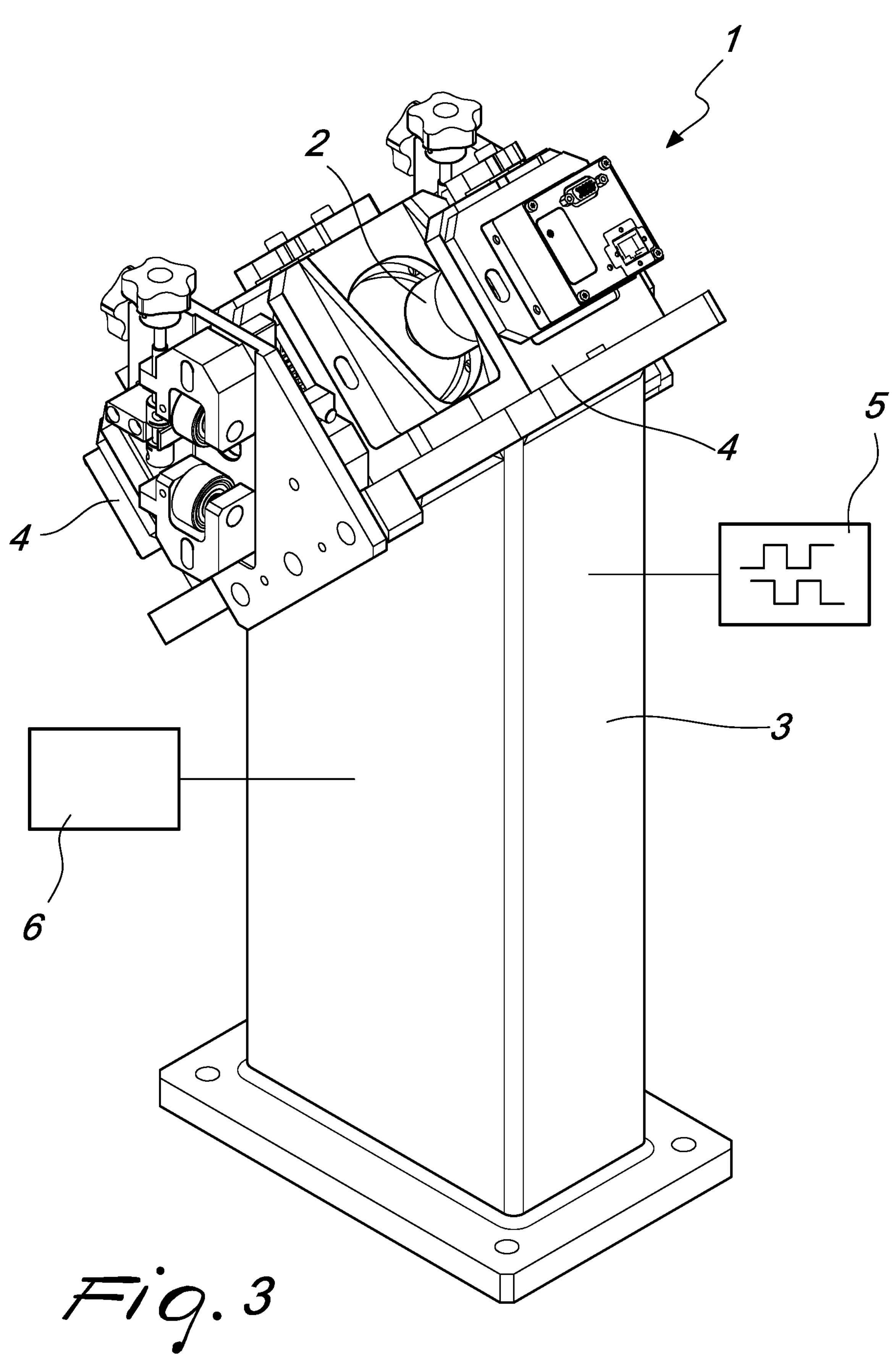
FIG. 3 is a schematic perspective view of an assembly for checking and verifying the correct stripping process of the insulating layer in predefined sections of a conducting wire covered by a layer of dielectric material according to the invention.
Figure 4:
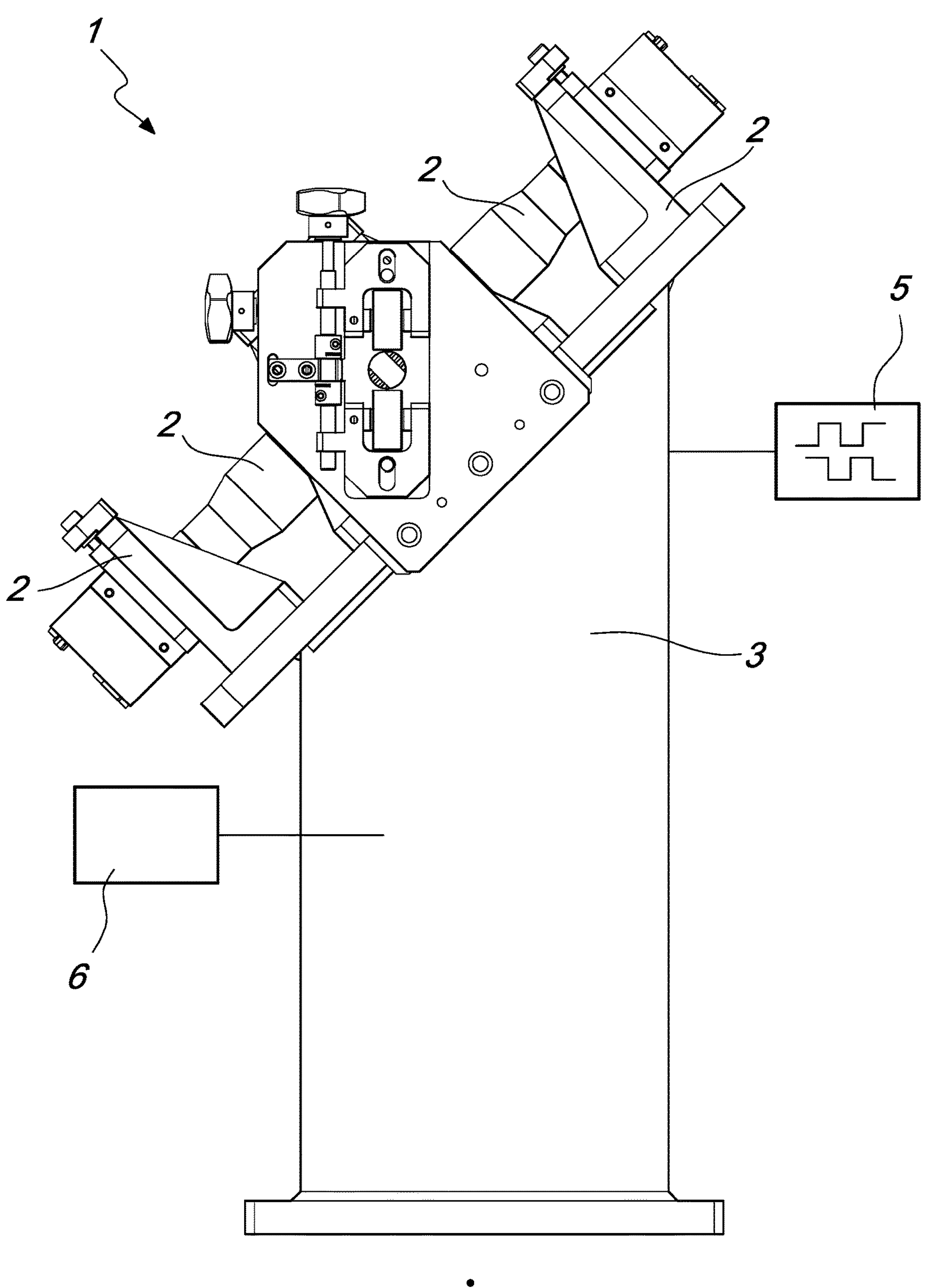
FIG. 4 is a schematic side view of the assembly of FIG. 3.
Figure 5:
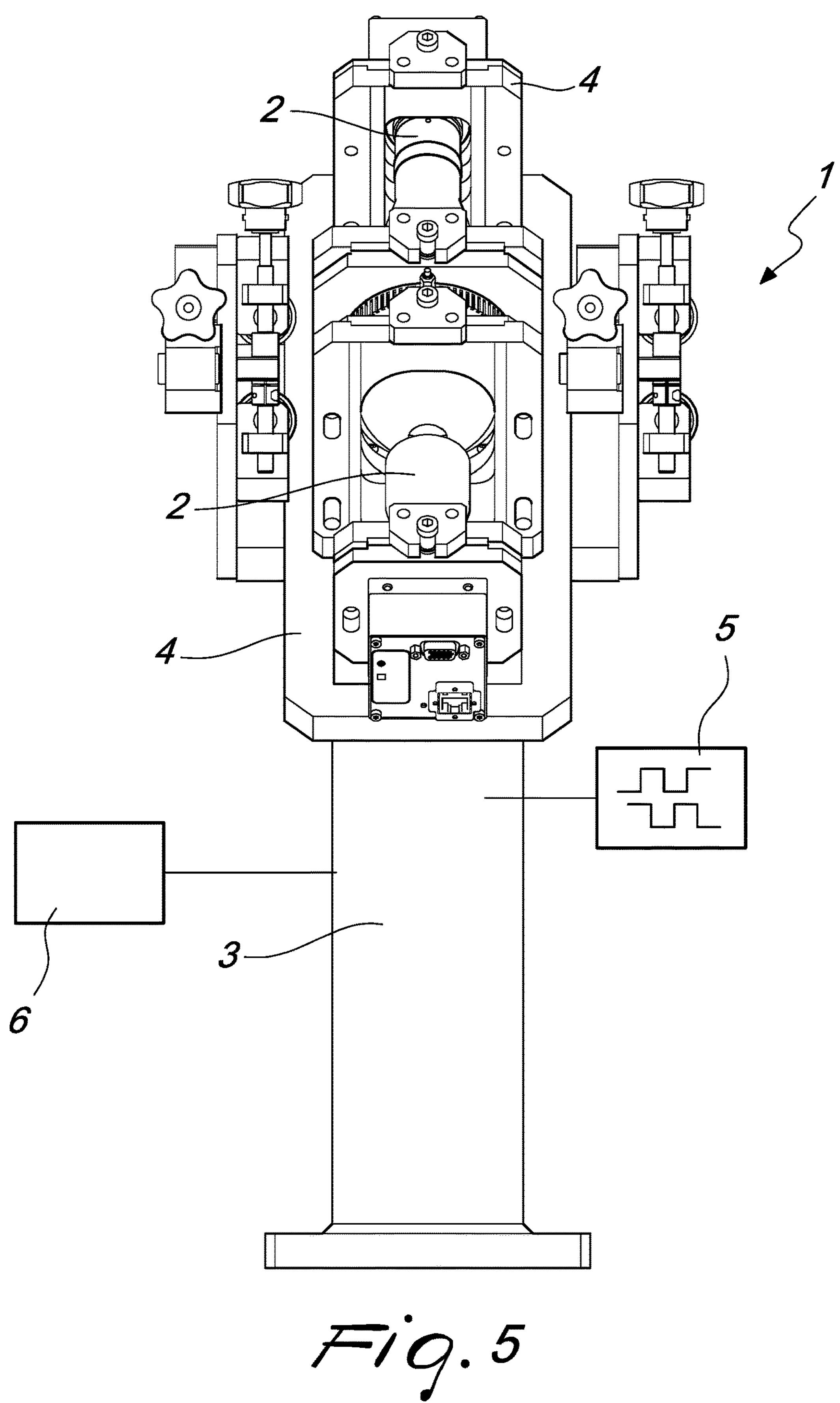
FIG. 5 is a schematic front elevation view of the assembly of FIG. 3.
Figure 6:
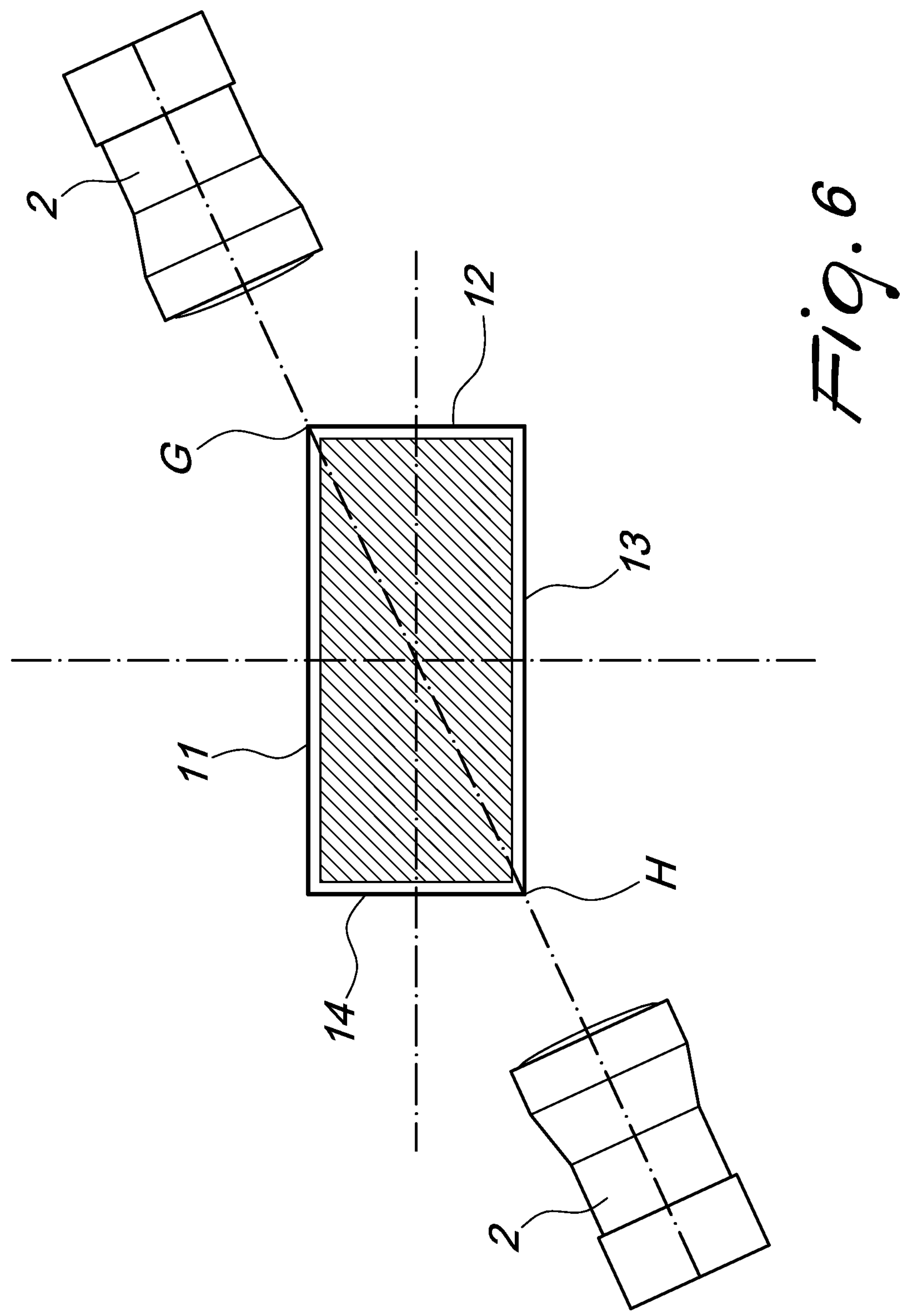
FIG. 6 is a schematic perspective view of the arrangement of the video cameras with respect to the wire in a possible embodiment of an assembly according to the invention.
Figure 7:
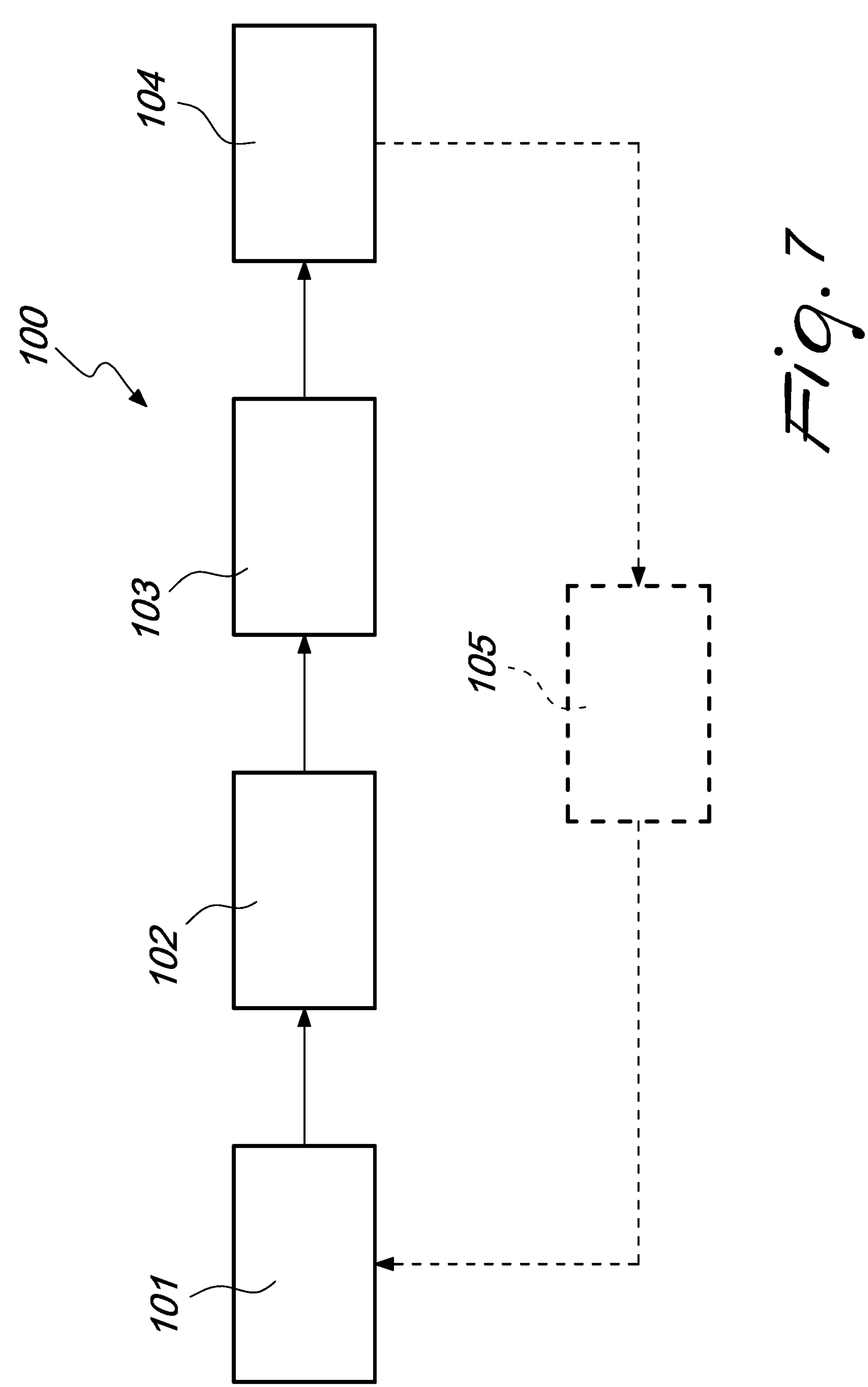
FIG. 7 is a block diagram of the method according to the invention.
Figure 8:
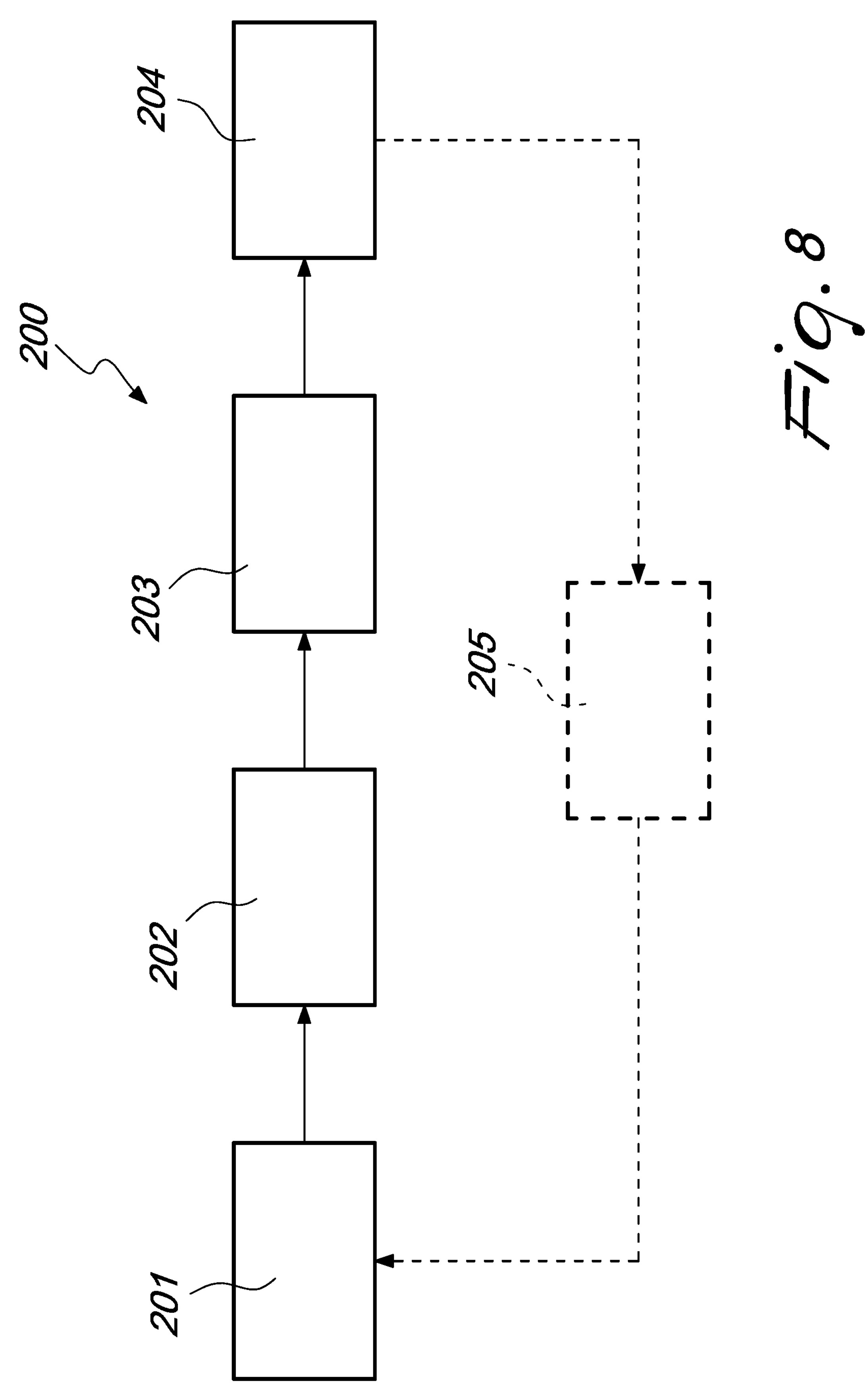
FIG. 8 is a block diagram of the software application according to the invention.

With reference to the figures, according to the invention, the reference numeral 1 generally designates an assembly for checking and verifying the correct stripping process of the insulating layer in predefined sections A of a conducting wire B covered by a layer C of dielectric material, which is installed in an apparatus D for treating and shaping a wire B for the purpose of providing components of electrical windings of electric machines (of the type of hairpins, i-pins and the like). The stripping process comprises stripping the wire B at pre-established intervals while the wire B advances.

The method 100 for checking and verifying the correct stripping process of the insulating layer in such sections A of the wire B comprises a first step 101 of continuous tagging of the advancement of the wire B, on which the sections A are present. Such tagging will conveniently be of a type chosen from positional and temporal: "continuous positional tagging" is defined as associating each acquired image with a specific position, which is identified using components that will be identified below (in practice, at each specific advancement of the wire B, whose length is known with a predefined precision, it will be possible to associate an image that corresponds to the portion of the section A shown in it); "continuous temporal tagging" is defined as detecting the position of each part of the wire B (and therefore also of the sections A) at each instant (according to a predefined temporal logic), so as to have the coordinates (along the normal path of translation of the wire B in the apparatus D) of each section A at each instant.

An application of specific applicative interest entails the adoption of positional tagging, although the possibility is not ruled out of an application of the present invention in a version that entails a temporal tagging of the acquired images.

Subsequently, in a second step 102 of the method 100 according to the invention, images of the advancement stroke of the wire B are acquired by way of at least one video camera 2 which faces and is proximal to at least one face of the wire B during its advancement stroke.

In particular, as previously mentioned, it is known to use a video camera 2 (or a TV camera or a photo camera or another image acquisition system) facing the wire, which is suitable to detect the dimensions and the features of the portion of wire toward which it is oriented: by virtue of such video camera 2 it is possible to check the length of each section from which the insulation has been stripped off, also checking if such stripping is complete or if there are any residues. This is clearly possible only for the portion of wire that is directed toward the video camera 2.

Preferably, the method according to the invention involves the use of two video cameras 2, so as to inspect mutually opposite surfaces of the wire B. Alternatively, it should be noted that the present invention also envisages the possibility of using a single video camera 2, by using cameras with a wide field of view (FOV) and/or dedicated optics such as lenses and/or mirrors, to monitor practically the entirety of the lateral surface of interest of the wire B. This additional embodiment, not shown in the figures, has the advantage of not requiring synchronization between the video cameras 2, and a lower cost of the viewing apparatus.

Once such images are acquired, in a third step 103 it will profitably be possible to associate the data acquired by the at least one video camera 2 with a respective continuous tagging associated with the advancement of the wire B (by performing a synchronization with the signal of an encoder 5, which will create a one-to-one association between the specific position assumed by the section A of wire B present in the image and a position reference, in positional tagging, or with a temporal reference, i.e. the instant when this was acquired, in temporal tagging). In the present discussion the term "video camera" means any viewing apparatus and/or image acquisition apparatus; this definition therefore includes TV cameras, photo cameras, optical sensors and any equivalent device, independently of whether it operates in the visible, infrared and/or ultraviolet spectrum.

It should be noted that the cited at least one video camera 2 will profitably be facing and proximal to at least one face of the wire B during its advancement stroke.

The method 100 according to the invention comprises finally a fourth step 104 of comparing the features detected by the images acquired by the at least one video camera 2 with reference parameters, in order to verify the correct dimensions and shape of each section A from which the layer C of insulating layer of dielectric material has been removed, and the absence of residues of dielectric material on the surface of said section A.

The step of comparing 104 comprises the use of models containing reference parameters suitable for detecting various defects and/or non-compliances in the stripped wire B such as laser misalignment, laser failure or malfunction, length errors, positioning errors or insufficient surface quality standards of the stripped sections A of the wire B.

With particular reference to an embodiment of undoubted practical and applicative interest, it should be noted that there can furthermore be an additional, fifth step 105 of feedback control of the operating parameters used in the stripping process of the insulating layer in the predefined sections A of the conducting wire B covered by the layer C on the basis of the defect and/or non-conformity detected during the fourth step 104. So in practice, with the fifth step 105 the method will apply a correction to the operating parameters used in the stripping process of the insulating layer in the predefined sections A of the conducting wire B covered by the layer C, so that they can operate in closer compliance with the theoretical results that are aimed at on the new section A which will subsequently be the aim/object of the method according to the invention.

The reference parameters can be specific parameters (dimensional, or referring to other values that can be detected on the acquired images, constituted by the frames acquired by the video camera) or they can be constituted by reference images referring to ideal sections A ("ideal" in terms of shape, dimensions, absence of residues on the surfaces, etc).

It should be noted that a further step, between the second step 102 of acquiring images of the advancement stroke of the wire B and the third step 103, can conveniently entail the synchronization of two mutually opposite video cameras 2.

These will be aligned with mutually opposite edges/surfaces of the wire B, the objective being that each one is adapted to acquire images of surface portions 11, 12, 13, 14 corresponding substantially to a predefined fraction of the surface of the wire B.

In particular, for a wire B having quadrilateral cross-section (for example square, rectangular etc.) these video cameras 2 will be aligned with mutually opposite edges of the wire B, the objective being that each one is adapted to acquire a respective image of the two concurrent and contiguous surfaces of the wire B, separated by the edge with which it is aligned.

The presence of two mutually opposite video cameras 2 will therefore make it possible to acquire images corresponding to the entire lateral surface of the wire B and therefore each section A can be examined completely (the verification of the correct stripping process of the layer C of dielectric material will be conducted on all the faces of that section).

Obviously, even if the wire B does not have a square cross-section, but has any cross-section (for example polygonal, circular, elliptical, irregular), with the two mutually opposite video cameras 2 it will still be possible to acquire images of two mutually opposite halves of that wire B, through which it is possible to reconstruct the external surface thereof (in particular at the sections A stripped of the layer C of insulating layer dielectric material).

Such reconstruction will always be possible, even if the video cameras are offset (along the advancement direction of the wire B), because the tagging (chosen from positional and temporal) of each discrete advancement made by each part of the wire B (in particular the corresponding sections A) during its translation makes it possible to associate every single frame with a specific position of the half of the wire B that faces each video camera 2: in this manner it is always possible to identify the images (i.e. the frames) corresponding to a predefined position of the wire B (and so mutually "synchronize" images acquired at different times because they correspond to a same part of the wire B, in particular to a same section A).

It should be noted that in the method 100 according to the invention, the tagging of the advancement of the wire can conveniently be done using an encoder 5.

It is recalled that an encoder 5 is an electromechanical device that converts the position of one of its components (for example the angular position of a rotating shaft thereof) into a digital electrical signal, thus behaving as a positional transducer that can ensure a high level of precision. It should therefore be noted that the frequency of the images acquired (i.e. of the frames acquired) by the at least one video camera 2 will positively be synchronized with the output signal of the encoder 5: in this manner each frame will be uniquely associated with a specific region of the wire, identified by a unique identifying encoding of the encoder 5, according to the predefined common tagging.

Each profile acquired by the video cameras 2 (which, according to a preferred embodiment, can be of linear type) can be associated with a predefined position through reference pulses generated by the encoder 5 (which are adapted to command the acquisition of an image by the video camera 2) and determined by its resolution: in this case, a positional tagging of each image acquired will therefore be made. Each reference positional pulse (determined by the resolution of the encoder 5) will therefore be adapted to command the video camera 2, resulting in the acquisition of an image of the profile of the wire B. At the end of the movement of the wire B, the juxtaposition of all the profiles (which are spatially equidistant, according to a predefined discrete pitch determined by the resolution of the encoder 5) will ensure the reconstruction of a two-dimensional image which it will be possible to carry out a feature analysis, returning measurements of the number of sections A in which the insulating layer has been stripped off, the start and end positions of each section A, and their quality indexes.

According to an alternative embodiment, it will also be possible to associate each image acquired by the video camera 2 with the instant (in the time domain) when the encoder 5 commands such image acquisition thus obtaining a temporal tagging.

The scope of protection defined by the present invention also extends to a software application 200 for checking and verifying the correct stripping process of the insulating layer in predefined sections A of a conducting wire B covered by a layer C of dielectric material. Such software application 200 will be run on a respective control and management unit 6 of an apparatus D for treating and shaping components of an electrical winding of an electric machine (for example an electric motor, an electricity generator and/or a transformer).

The software application 200 according to the invention can positively comprise instructions for detecting the position 201 of each portion of the wire B along the apparatus D and the associated continuous tagging.

Such tagging can be of a type chosen from positional (identifying the specific position of the wire A, by virtue of an acquisition command executed upon an advancement of a predefined length traveled by that wire B) and temporal (identifying the position progressively assumed by each portion of the wire B at each individual instant, during its advancement).

The software application 200 according to the invention is safe and effective in application if a positional tagging is adopted, although the possibility is not ruled out of implementing it by adopting a temporal tagging.

The application according to the invention further comprises instructions for acquiring images 202 by way of a viewing apparatus such as a video camera 2, photo camera, TV camera and the like. Obviously the viewing apparatus can also comprise two (or more) video cameras 2, photo cameras, TV cameras and the like.

With particular reference to an embodiment of undoubted applicative interest, the adoption of a linear TV camera is envisaged, which produces an image constituted by a single line of points for each tagging synchronized with the movement of the wire B.

This embodiment makes it possible to reconstruct two-dimensional images through the juxtaposition of one-dimensional images (constituted by a line of points, as explained previously), which when placed side-by-side makes it possible to build up the image of the surface of the wire B.

These instructions will then synchronize the images acquired (i.e. the frames acquired) by the viewing apparatus with the tagging corresponding to the positions taken by each portion of the wire B during its advancement along the apparatus D.

The application according to the invention usefully comprises instructions for associating 203 at least one acquired image (i.e. a frame) with at least one face of each section A of wire B from which the insulating layer has been removed, to which the image depicted in the frame corresponds.

This application according to the invention lastly will comprise instructions for comparing 204 at least one characteristic (a parameter), obtainable from at least one frame, chosen from dimensions, shape, surface smoothness, presence of stains, presence of residues and the like with at least one reference parameter (which corresponds to the ideal conditions).

As specified previously for the method 100, for the application software program 200 also, an embodiment of undoubted practical and applicative interest is envisaged, in which further instructions 205 of feedback control of the operating parameters are used in the stripping process of the insulating layer in the predefined sections A of the conducting wire B covered by the layer C on the basis of the defect and/or non-conformity detected and compared by way of the instructions 104. Therefore, the software application 200 will use the instructions 205 to apply a correction to the operating parameters used in the stripping process of the insulating layer in the predefined sections A of the conducting wire B covered by the layer C, so that they can operate in closer compliance with the theoretical results that are aimed at on the new section A which will subsequently be the focus of the method according to the invention.

With particular reference to an alternative embodiment, it should be noted that the instructions 204 for comparing at least one characteristic (i.e. a parameter) can positively comprise instructions 204 for comparing the at least one image with a reference image that corresponds to the ideal surface of a predefined section A of wire B from which the layer C of insulating layer has been removed.

In practice, therefore, the software application 200 can profitably comprise the instructions 205 for reacting in the event of the detection of defects, in order to perform feedback control of the first station E and/or interrupt the operation of the apparatus 1.

Upon detecting a non-conformity in one of the sections A present on the wire B, it will then be possible to interrupt the operation of the assembly 1 and proceed to control the first station E to remove the layer C of insulation at predefined sections A so as to eliminate the problems encountered. The possibility is not ruled out that these instructions 205 could directly identify corrective actions, applied according to a feedback control logic directly on the first station E, on the laser or on any further components involved, in order to progressively reduce the presence of the problems encountered.

The scope of protection defined by the present invention extends to an assembly 1 for checking and verifying the correct stripping process of the insulating layer in predefined sections A of a conducting wire B covered by a layer C of dielectric material.

This assembly 1 can be installed in apparatuses D for treating and processing wires B which comprise a first station E for removing the layer C of insulation at predefined sections A and a second station F for shaping and cutting the wire B into segments.

As explained previously, preferably the assembly 1 according to the invention involves the use of two video cameras 2, which are configured to inspect mutually opposite surfaces of the wire B. Alternatively, it should be noted that the present invention also envisages the possibility of using a single video camera 2, with a wide field of view (FOV) and/or associated with dedicated optics such as lenses and/or mirrors, which is configured and dimensioned to monitor practically the entirety of the lateral surface of interest of the wire B.

This additional embodiment, not shown in the figures, has the advantage of not requiring synchronization between the video cameras 2, and a lower cost of the viewing apparatus.

The assembly 1 according to the invention advantageously comprises at least one encoder 5 suitable to detect the instantaneous position of the wire B during its advancement, and, downstream of such first station E and upstream of the second station F, at least one video camera 2 aligned with at least one face of the wire B.

Conveniently the assembly 1 further comprises a control and management unit 6 which is configured to synchronize the frequency of the images acquired (i.e. of the frames acquired) by the at least one video camera 2 with the output signal from the encoder 5, for the positional tagging of each image/frame and the consequent unique association thereof with the corresponding region of the wire B that it represents.

The possibility is not ruled out that the control and management unit 6 can be configured to synchronize the frequency of the images acquired (i.e. of the frames acquired) by the at least one video camera 2 with the output signal from the encoder 5, in order to obtain a temporal tagging of each image/frame.

In practice, by virtue of the encoder 5 it will be possible to know the exact position in which any portion of the wire B is (if positional tagging is used), or the instant in time when that image was acquired, which can then be used to calculate the respective position using the rule of motion of the wire B along the apparatus D (if temporal tagging is used), because the encoder 5 (being a position transducer) exactly identifies the coordinate of the portion of interest (the wire B moves along a known trajectory and therefore only one coordinate is necessary to identify any part thereof, and that coordinate uniquely identifies the advancement of the wire B and, in particular, of every portion thereof). Obviously, given the need to check the sections A from which the layer C of dielectric material has been removed, using the encoder 5 it will therefore be possible to know the instantaneous position (i.e. the variations of the position as a function of the passage of time) of each section A.

It should be noted that the at least one video camera 2 is aligned with and proximal to an edge of the wire B so that each frame acquired by it comprises the image of two contiguous faces of the wire B which define that edge.

Obviously, even if the wire B were not quadrilateral in cross-section, but had any cross-section (for example polygonal, circular, elliptical, irregular) the at least one video camera 2 aligned with the edge G, H (which for a circular or elliptical cross-section will coincide with a generatrix, in particular the midpoint generatrix) will in any case be able to acquire images of one half of the wire B.

With particular reference to an embodiment of undoubted practical and applicative interest, the assembly 1 according to the invention can advantageously comprise two separate, mutually opposite video cameras 2 which are aligned and are proximal to mutually opposite edges of the wire B.

Each frame acquired by a first video camera 2 will comprise the image of two contiguous faces of the wire B which define the first edge G of the wire B (more generally, of a first half of the wire B which may be constituted by two or more contiguous faces, or of a curved surface).

Similarly, each frame acquired by a second video camera 2 will comprise the image of two contiguous faces of the wire B which define a second edge H of the wire B (more generally, of a second half of the wire B which may be constituted by two or more contiguous faces, or of a curved surface).

This will therefore determine the image acquisition of the entire lateral surface of the wire B, enabling an in-depth examination of the entire lateral surface of each section A that has been stripped of the layer C of insulation of dielectric material.

With particular reference to the arrangement of the video cameras 2 along the path of advancement of the wire B in the apparatus D, it should be noted that the video cameras 2 can be mutually arranged according to a configuration chosen from between mutually aligned and mutually offset.

In the case of mutual alignment, the central axis of the optical cone of a first video camera 2 will coincide with the corresponding axis of the other video camera 2, so that they are mutually opposite and aligned, with the wire B interposed in between.

In this case, these coinciding central axes of the optics of the video cameras 2 can preferably lie on a plane that is perpendicular to the axis of the wire B in its portion interposed between the video cameras 2; however, the possibility is not ruled out that these coinciding central axes of the optics of the video cameras 2 could be skewed with respect to the axis of the wire B in its portion interposed between the video cameras 2.

In the case of mutually offset arrangement, the central axis of the optical cone of a first video camera 2 will be distinct from the corresponding axis of the other video camera 2: in practice the two video cameras 2 will be facing separate portions of the wire B (for example one further along than the other), and these portions will in any case be mutually opposite (so that each video camera 2 will in any case be aligned with a first half of the surface of the wire B and the other video camera 2 with a second half of the surface of the wire B).

If there are two (or more) video cameras 2, the control and management unit 6 will be configured to mutually associate separate images (i.e. separate frames) corresponding to a same section A of wire B (acquired by different video cameras 2) on the basis of the common tagging (obtained by virtue of the encoder 5 suitable to detect the position of each portion of the wire B), independently of the mutual configuration/arrangement of the video cameras 2.

By virtue of this synchronization activity performed by the control and management unit 6 it will therefore be possible to reconstruct the complete image of the external surface of each portion of the wire B (in particular the external surface of the sections A that have been stripped off the insulation layer C of dielectric material), even if the video cameras 2 are offset (along the advancement direction of the wire B). In fact the tagging of each position assumed by each portion of the wire B (in particular the corresponding sections A) during its advancement makes it possible to associate every single frame (acquired by one of the video cameras 2, independently of whether they are mutually aligned or offset) with a specific position of the half of the wire B that faces each video camera 2.

Therefore it is possible to identify the images (i.e. the frames) that correspond to a predefined position of the wire B (and therefore to mutually "synchronize" images acquired at different times because they correspond to a same part of the wire B, in particular to a same section A).

Obviously, the scope of protection of the present invention also extends to any apparatus D that comprises an assembly 1 according to the invention and/or carries out the method 100 according to the invention or is provided with a computer adapted to run a software application 200 according to the invention.

With particular reference to the embodiment shown for the purposes of non-limiting example in the accompanying figures, the assembly 1 can comprise a main body 3 which is provided with at least one bracket 4 to which the at least one video camera 2 will be affixed.

By virtue of the particular arrangement of the brackets 4, if there are two separate video cameras 2, they will be arranged with their lenses facing each other and mutually aligned, with the wire B interposed in between.

Purely for the purposes of non-limiting example, it should be noted that a possible applicative version of the present invention can entail starting the machine cycle (which will determine the activation of the image acquisition by the viewing apparatus of the assembly 1). At this point the wire B will move linearly along the apparatus D, following a rule of motion that is not known to the assembly 1 according to the invention. The signal of the encoder 5, in following the movement of the wire B, will send a pulse (determined by the operating logic of the encoder 5 itself), for each section A equal to the resolution of the encoder 5, to the at least one video camera 2 (for the sake of simplicity this resolution could correspond to 0.1 mm).

The video cameras 2, at each pulse supplied by the encoder 5, will acquire an image that corresponds to a linear profile of the portion of wire B that faces them. Each image corresponding to a linear profile of the portion of wire B that faces them is juxtaposed to the preceding image, resulting in the creation of a two-dimensional image that corresponds to the surface of the wire B (reconstructed as many discrete images that each depict a portion of 0.1 mm of at least one surface of that wire B).

At this point the wire B is stopped on the apparatus D and the acquisition of images is interrupted.

The image resulting from the juxtaposition of the linear images can then be sent to the control and management unit 6, which interprets it as a set of "sections" of wire B taken at a distance of 0.1 mm (this incremental dimension is given solely for the purposes of example, since any resolution can be adopted according to the specific applicative requirements).

Advantageously, the present invention solves the above mentioned problems, by providing a method 100 for checking and verifying the correct stripping process of the insulating layer in predefined sections A of a conducting wire B covered by a layer C of dielectric material that makes it possible to inspect the external surface of the whole wire B and, in particular, of each section A.

Conveniently, the method 100 according to the invention ensures the identification of defects related to the quality, uniformity, and geometry of the surfaces of the sections A stripped of insulation.

Upon detecting a non-conformity in one of the sections A present on the wire B, it will be possible to interrupt the operation of the apparatus and proceed to control the first station E to remove the layer C of insulation at predefined sections A so as to eliminate the problems encountered.

To correct some specific defects that can be detected on the quality of the stripping process of the layer C of dielectric material in one or more sections A, the possibility is not ruled out of performing a feedback control of the first station E without the necessity to interrupt the operation of the apparatus 1 (with the advantage of not interrupting production).

Profitably the method 100 according to the invention makes it possible to identify any residues of insulation (layer of dielectric material) on all of the surfaces of the section A in which the insulating layer has been stripped off. The stripping process of the layer C is generally done using a laser, which causes the sublimation of the dielectric material: this process can leave charred residues of dielectric material on the surface of a section A, which may be damaging for subsequent treatments to which the wire B will be subjected.

Identifying such residues makes it possible to adjust the laser of the first station E so as to prevent similar residues from arising again later: obviously the chosen power of the laser beam to be used has an upper limit which is dictated by the need not to damage the wire B, and therefore the goal is to adopt a power level that ensures the complete elimination of any residues of dielectric material from the surfaces of the sections A without damaging the wire B in any way.

Positively the assembly 1 according to the invention is adapted to detect the surface features of the entire wire A.

Usefully the assembly 1 according to the invention is adapted to detect the correct dimensions and/or the correct alignments and/or the presence of residues of dielectric material and/or the correct position of each section A stripped of the surface insulation layer C of dielectric material of the wire B.

Effectively the assembly 1 for checking and verifying the correct stripping process of the insulating layer according to the invention is adapted to detect the correct dimensions and/or the correct alignments and/or the presence of residues of dielectric material and/or the correct position of each section A stripped of the surface insulation layer C of dielectric material of the wire B.

Positively, the method 100, the software application 200 and the associated assembly 1 according to the invention are technical solutions that are easily and practically implemented and are low-cost: such features make the method 100, the software application 200 and the assembly 1 according to the invention innovations that are certain to be safe in use.

The invention thus conceived is susceptible of numerous modifications and variations, all of which are within the scope of the appended claims. Moreover, all the details may be substituted by other, technically equivalent elements.

In the embodiments illustrated, individual characteristics shown in relation to specific examples may in reality be interchanged with other, different characteristics, existing in other embodiments.

In practice, the materials employed, as well as the dimensions, may be any according to requirements and to the state of the art.

The disclosures in Italian Patent Application No. 102022000017700 from which this application claims priority are incorporated herein by reference.

The invention claimed is:

1. A method for checking and verifying a correct stripping process on sections of a conducting wire covered by a layer of dielectric material, wherein the stripping process comprises stripping the conducting wire at pre-established intervals while said conducting wire advances, said method comprising the steps of:

- tagging the advancing conducting wire having been stripped off stripped sections, said tagging comprising acquiring information related to a position and/or a time at a predefined sampling rate;
- acquiring images of said conducting wire by at least one video camera arranged proximal to and facing at least one face of said conducting wire;
- associating the images acquired by said at least one video camera with a respective tagging information acquired for a same point on said conducting wire;
- extracting features from the images acquired by said at least one video camera and comparing them with respective reference features to verify a correct linear dimension and/or relative position and/or absence of residues of dielectric material on a surface of each stripped section along the conducting wire.

2. The method according to claim 1, wherein the step of acquiring images comprises use of a first and second video camera, wherein said second video camera is arranged opposite to said first video camera with said conducting wire therebetween, and wherein said first and second video cameras are synchronized with each other in order to acquire images of surface portions of said conducting wire at a given region of said conducting wire.

3. The method according to claim 1, wherein said first step of tagging the advancement of said wire is performed by an encoder.

4. The method according to claim 1, wherein the step of acquiring images is performed at a frequency which is function of a predefined sampling rate of the tagging step, so that each acquired image is uniquely associated with a specific region of said conducting wire by a unique identification, according to the predefined tagging step.

5. The method according to claim 2, wherein in said step of acquiring images, said at least said one video camera records linear images, and wherein said linear images are subsequently juxtaposed sequentially in order to generate corresponding two-dimensional images.

6. The method according to claim 1, wherein the step of stripping is performed with a laser device configured to remove a layer of dielectric material on said conducting wire.

7. The method according to the claim 6, wherein the step of comparing comprises use of models containing reference parameters suitable for detecting various defects and/or non-compliances in the stripped wire such as laser misalignment, laser failure or malfunction, length errors, positioning errors or insufficient surface quality standards of the stripped sections of the conducting wire.

8. The method according to the claim 7, further comprising an additional feedback control step for regulating, when necessary, operating parameters used for the stripping process based on a detected defect and/or non-compliance during said comparing step.

9. A non-transitory computer-readable medium storing a software application for checking and verifying a correct stripping process of insulating layer in predefined sections of a conducting wire covered by a layer of dielectric material, said software application being configured to run in an apparatus for processing and shaping components of an electrical winding of an electric machine, comprising instructions for providing a method for checking and verifying a correct stripping process of the insulating layer according to claim 2.

10. An assembly for checking and verifying a correct stripping process of an insulating layer in predefined sections of a conducting wire covered by a layer of dielectric material, said assembly being installable in apparatuses configured for processing and shaping conducting wires, said apparatus comprising:

- a first station configured and dimensioned to strip off portions of the layer of dielectric material at predefined sections of the conducting wire advancing along a processing path,
- a second station arranged downstream of the first station and configured to shape and cut the conducting wire originating from the first station into conductor segments, wherein said assembly comprises:

- at least one encoder configured to detect an instantaneous position of the advancement of said conducting wire, with consequent temporal and/or positional tagging of said position, said at least one encoder being configured to generate a signal output of each performed tagging,
- at least one video camera configured to be arranged downstream of said first station and upstream of said second station, said at least one video camera being configured to be aligned with at least one face of said conducting wire and being configured to acquire images of said advancing conducting wire, and a control and management unit configured for synchronization of a frequency of the images acquired by said at least one video camera with the signal output from said encoder, for a positional and/or temporal tagging of each image and a consequent unique association thereof with a corresponding region of said conducting wire, and for a feature extraction of the acquired images and a comparison thereof with reference features.

11. The assembly according to claim 10, wherein said at least one video camera is aligned with and proximal to an edge of said conducting wire, each image acquired by said at least one video camera comprising an image of two contiguous faces of said conducting wire which define said edge.

12. The assembly according to claim 10, wherein said at least one video camera comprises a first and a second video camera, and wherein said control and management unit is configured to associate the images acquired by each of said first and second video camera corresponding to the same region of conducting wire) based on their tagging thereof.

13. The assembly according to claim 12, wherein said first and second video cameras are arranged mutually opposite with said conducting wire therebetween, are aligned and proximal to opposite edges of a transverse cross-section of said conducting wire, each image acquired by said first video camera comprising an image of two contiguous faces of said conducting wire which define a first edge of said conducting wire, each image acquired by said second video camera comprising an image of two contiguous faces of said conducting wire which define a second edge of said wire in order to allow an identification of an entire lateral surface of a wire region.

14. The assembly according to claim 10, wherein said first and second video cameras are mutually arranged according to a configuration chosen from mutually aligned and mutually offset along the advancement path of the conducting wire.

* * * * *